US012329325B2

United States Patent
Shiraki et al.

(10) Patent No.: US 12,329,325 B2
(45) Date of Patent: *Jun. 17, 2025

(54) AUTOMATED COOKING DEVICE

(71) Applicant: TECHMAGIC INC., Tokyo (JP)

(72) Inventors: Yuji Shiraki, Tokyo (JP); Eiji Ishiwata, Tokyo (JP); Shohei Mawatari, Tokyo (JP)

(73) Assignee: TECHMAGIC INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,459

(22) Filed: Apr. 17, 2024

(65) Prior Publication Data

US 2024/0260791 A1    Aug. 8, 2024

Related U.S. Application Data

(63) Continuation of application No. 18/507,105, filed on Nov. 13, 2023, now Pat. No. 11,986,131, which is a (Continued)

(30) Foreign Application Priority Data

May 14, 2021  (JP) ................................. 2021-082484

(51) Int. Cl.
*A47J 44/00*    (2006.01)
(52) U.S. Cl.
CPC ..................... *A47J 44/00* (2013.01)
(58) Field of Classification Search
CPC .... A47J 43/08; A47J 37/1295; A47J 37/1228; A47J 27/14; A47J 37/049; A22C 17/0033; A23L 1/01; A23G 9/286; A21C 15/007

(Continued)

(56) References Cited

U.S. PATENT DOCUMENTS

2017/0172350 A1 *  6/2017  Farid ...................... A47J 44/00
2019/0329419 A1   10/2019  Farid et al.

FOREIGN PATENT DOCUMENTS

CN       109475247 A    3/2019
CN       208692910 U    4/2019
(Continued)

OTHER PUBLICATIONS

International Search Report in PCT Application No. PCT/JP2022/016247 mailed Jun. 14, 2022, 5pp.

(Continued)

*Primary Examiner* — Phuong T Nguyen
(74) *Attorney, Agent, or Firm* — HAUPTMAN HAM, LLP

(57) ABSTRACT

An automated cooking device includes a control unit controls the driving of a rotation driving mechanism of a container holding unit and a rotation unit so as to change the container holding unit to any of an ingredient receiving posture in which a cooking container receives ingredients I from an ingredient supply device, a cooking posture in which a container rotation mechanism rotates the cooking container in a state in which the cooking container is inclined with respect to a cooking table so as to stir the ingredients I, a serving posture in which the container holding unit is inclined with respect to the cooking table so as to make the cooking container face downward to a dish D, and a washing posture in which a rotation support mechanism of the container holding unit is inclined with respect to a base frame and the cooking container is washed.

6 Claims, 11 Drawing Sheets

Related U.S. Application Data continuation of application No. PCT/JP2022/016247, filed on Mar. 30, 2022.

(58) Field of Classification Search
USPC ......... 99/324, 325, 326, 330, 334, 348, 352, 99/353, 355, 358, 384, 385, 386, 441, 99/517; 426/274, 275, 574, 629, 641, 426/656, 634, 516–519, 531, 801, 335, 426/316, 320, 532, 129
See application file for complete search history.

(56) References Cited

FOREIGN PATENT DOCUMENTS

| | | |
|---|---|---|
| CN | 209058815 U | 7/2019 |
| CN | 209826353 U | 12/2019 |
| EP | 3448212 A1 | 3/2019 |
| JP | H11-028155 A | 2/1999 |
| JP | 2014-108207 A | 6/2014 |
| KR | 10-2106929 B1 | 5/2020 |
| WO | 2017189147 A1 | 11/2017 |

OTHER PUBLICATIONS

Written Opinion in PCT Application No. PCT/JP2022/016247 mailed Jun. 14, 2022, 6pp.

* cited by examiner

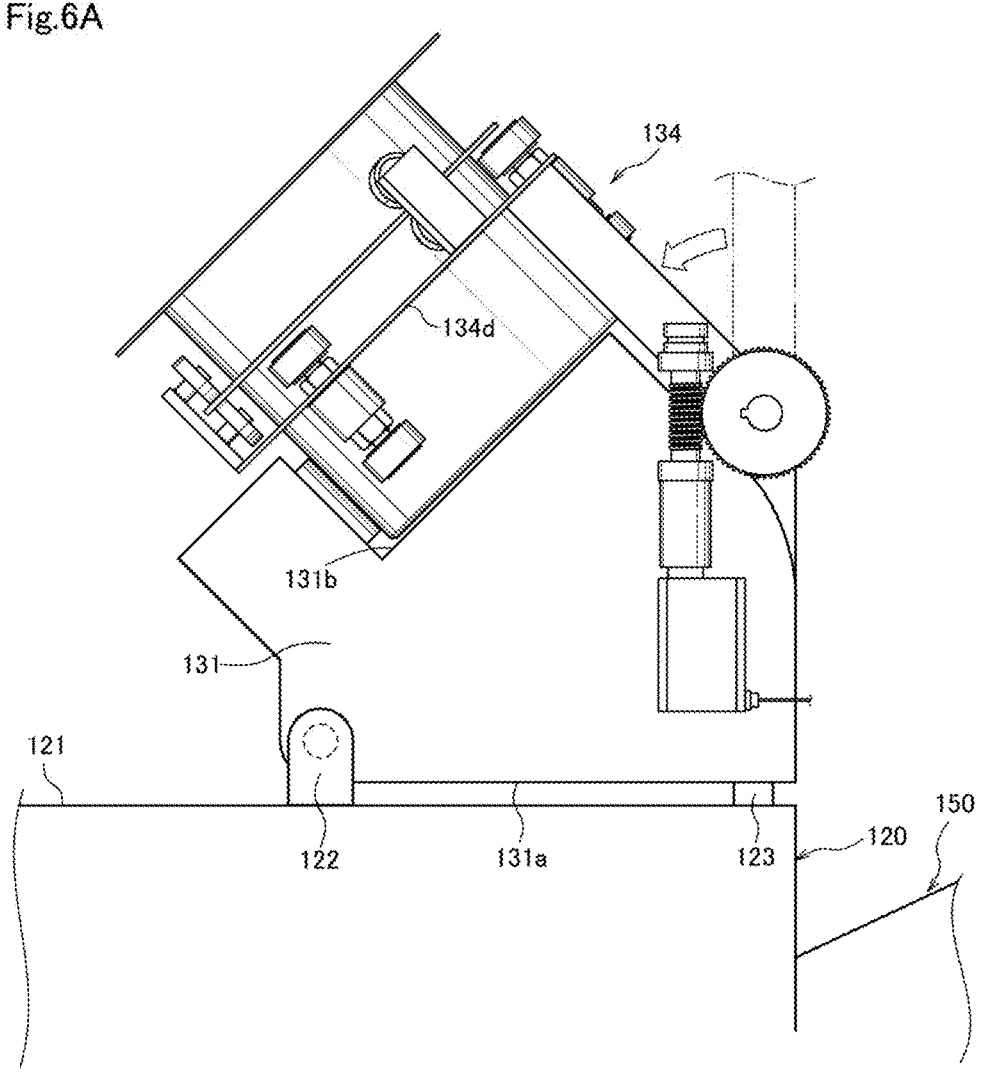

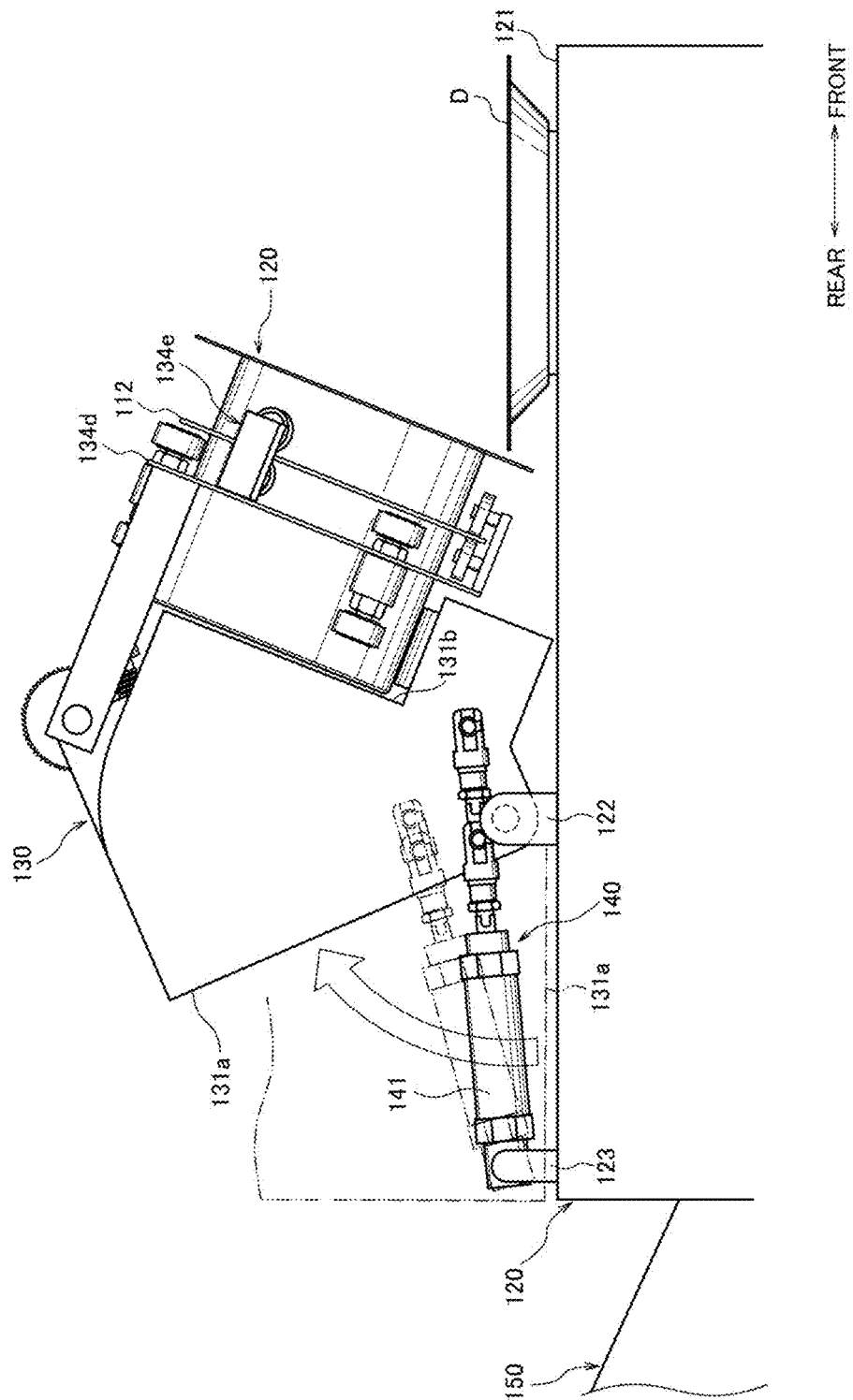

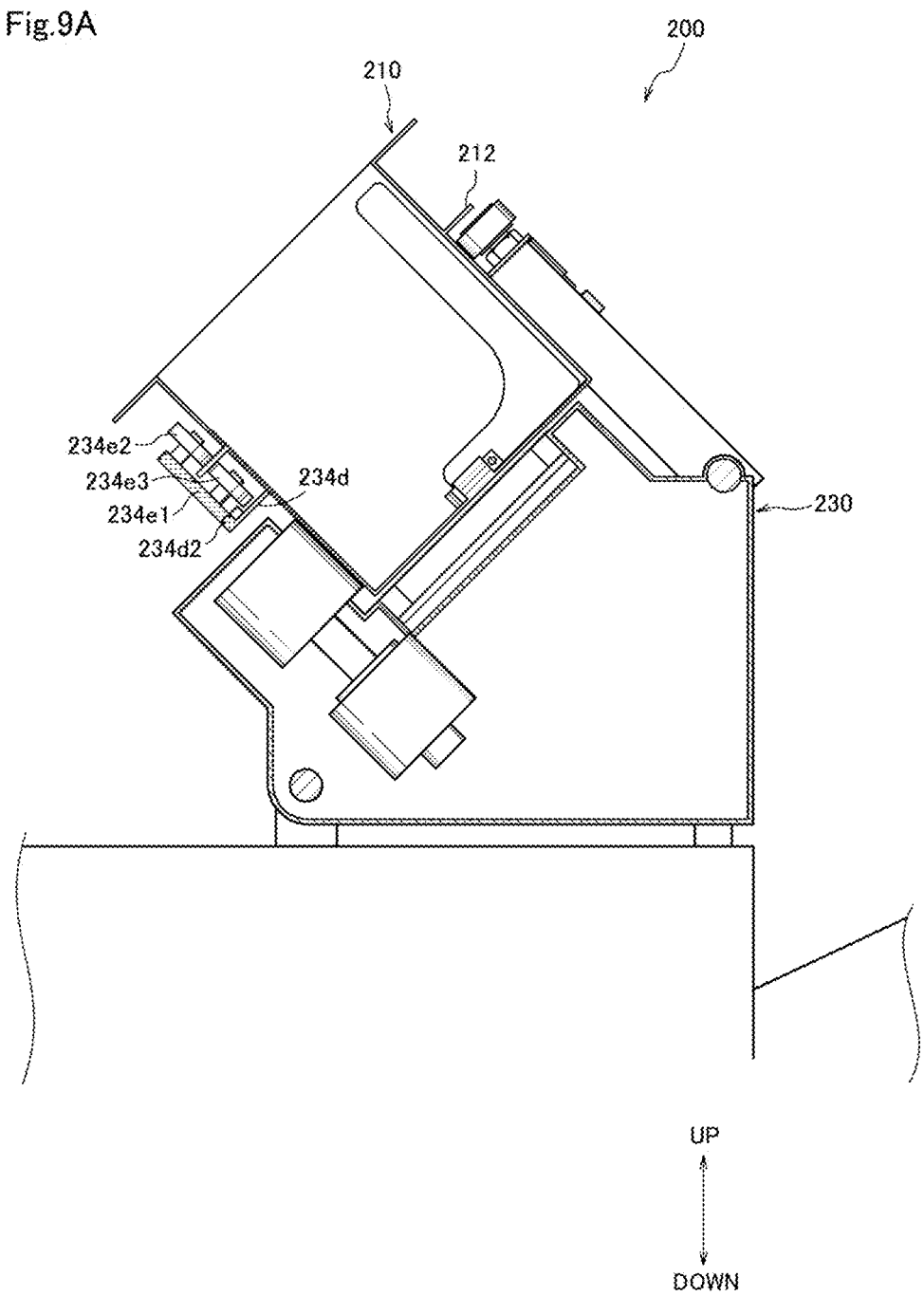

AUTOMATED COOKING DEVICE

The present application is a continuation of U.S. patent application Ser. No. 18/507,105 filed on Nov. 13, 2023, which is a National Stage Entry of PCT/JP2022/016247 filed on Mar. 30, 2022 and claims the benefit of priority from the prior Japanese Patent Application No. 2021-082484, filed on May 14, 2021, the entire contents of which are incorporated herein by reference.

FIELD

The present invention relates to an automated cooking device, and particularly to an automated cooking device that at least stirs and cooks ingredients contained in a cooking container.

BACKGROUND

In recent years, in order to secure cooks, maintain cooking skills, improve cooking environments, and other factors in restaurant business, automation of cooking operations has made progress.

One of the conventionally known automated cooking devices made in view of the above includes a pot where stirring and cooking with desired rotation are performed, an induction heating plate that is disposed beside and adjacent to an outer peripheral wall surface of this pot, and a driving mechanism that operates the pot to each of positions for an ingredient receiving posture, an ingredient heating and mixing posture, a food distributing posture, and a pot washing posture (for example, Patent Literature 1).

CITATION LIST

Patent Literature

[Patent Literature 1] U.S. Patent Application Publication No. 2019/0329419

SUMMARY

Technical Problem

The automated cooking device as described above is configured so that the pot both in the food distributing posture and in the pot washing posture exists on the front side of the device.

Therefore, washing water in washing the pot in the washing posture splashes toward a dish on which the food is distributed, which may stain the food itself or the dish on which the food is distributed.

In the automated cooking device as described above, the induction heating plate is disposed beside and adjacent to the outer peripheral wall surface of the pot, so that the induction heating plate is in a heated state while being the closest on a bus line of the outer peripheral wall surface of the pot. Accordingly, the heat conduction efficiency to the pot cannot be achieved sufficiently, which results in the problem that a food requiring high heating power in a short time, such as a fried food, cannot be cooked in a short time.

In view of this, the present invention has been made to solve the aforementioned problem of the conventional art, and it is an object of the present invention to provide an automated cooking device in which a cooking container is washed without staining a food or a dish on which the food is distributed.

Solution to Problem

An aspect of the invention according to claim 1 is an automated cooking device comprising: a container holding unit pivotally provided a cooking container; a rotation unit provided configured to make the container holding unit go up and down with respect to a cooking table; and a control unit configured to control driving of the container holding unit and the rotation unit, the automated cooking device being configured to at least stir and cook ingredients contained in the cooking container, wherein the container holding unit includes a base frame coupled to the rotation unit, a container rotation mechanism provided in the base frame and configured to rotate the cooking container, a rotation support mechanism supporting rotation of the cooking container, and a rotation driving mechanism configured to rotate the rotation support mechanism in a manner of being able to make the rotation support mechanism go up and down with respect to the base frame, and the control unit controls the driving of the rotation driving mechanism of the container holding unit and the rotation unit so as to change the container holding unit to any of an ingredient receiving posture in which the cooking container receives the ingredients, a cooking posture in which the container rotation mechanism rotates the cooking container in a state in which the cooking container is inclined with respect to the cooking table so as to stir the ingredients, a serving posture in which the container holding unit is inclined more than in the cooking posture with respect to the cooking table, and a washing posture in which the rotation support mechanism of the container holding unit is made go up and down and the cooking container is washed. Thus, the aforementioned problem is solved.

An aspect of the invention according to claim 2 is the aspect of the automated cooking device according to claim 1, in which an opening part of the cooking container is directed downward in the washing posture. Thus, the aforementioned problem is solved further.

An aspect of the invention according to claim 3 is the aspect of the automated cooking device according to claim 1, in which the container holding unit includes a container heating part configured to heat the cooking container while facing, with a space, an outer bottom surface of the cooking container in the cooking posture. Thus, the aforementioned problem is solved.

An aspect of the invention according to claim 4 is the aspect of the automated cooking device according to any one of claim 1, in which the cooking container is detachably attached to the container holding unit. Thus, the aforementioned problem is solved further.

An aspect of the invention according to claim 5 is the aspect of the automated cooking device according to any one of claim 1, in which the cooking container includes a stirring member provided on an inner bottom surface or an inner side surface of the cooking container and protruding toward an internal space of the cooking container. Thus, the aforementioned problem is solved further.

An aspect of the invention according to claim 6 is the aspect of the automated cooking device according to claim 1, a pivot axis of the container holding unit with respect to the cooking table and a rotation axis of the rotation support mechanism of the container holding unit with respect to the base frame are disposed apart each other in the horizontal direction of the cooking table.

Advantageous Effects of Invention

According to the present invention, the control unit controls the driving of the rotation driving mechanism of the container holding unit and the rotation unit so as to change the container holding unit to any of the ingredient receiving posture, the cooking posture, the serving posture, and the washing posture. Thus, by simply changing the container holding unit in the order of the ingredient receiving posture, the cooking posture, and the serving posture, the ingredients can be stirred and cooked, and served on a dish. Accordingly, by repeatedly changing the container holding unit in the order of the ingredient receiving posture, the cooking posture, the serving posture, and the washing posture, a large amount of foods can be cooked automatically and additionally, the following effects can be obtained.

That is to say, in the automated cooking device in the aspect of the invention according to claim 1, the pivot axis of the container holding unit with respect to the cooking table is disposed apart to the front side from the rotation axis of the rotation support mechanism of the container holding unit with respect to the base frame, and the control unit controls the driving of the rotation driving mechanism of the container holding unit and the rotation unit so as to change the container holding unit to at least the serving posture in which the container holding unit is inclined forward more than in the cooking posture with respect to the cooking table so as to make the cooking container face downward to a dish placed on the front side of the container holding unit, and the washing posture in which the rotation support mechanism of the container holding unit is inclined backward with respect to the base frame and the cooking container is washed on the rear side of the container holding unit. Thus, the position of the cooking container in the front-rear direction in the serving posture and the position of the cooking container in the front-rear direction in the washing posture get away from each other farther in the front-rear direction than in the case where the cooking container is rotated in the front-rear direction of the cooking table by one rotation shaft. Accordingly, when the cooking container is washed in the washing posture, the washing water for washing the inner surface of the cooking container and the stain adhering to the inner surface of the cooking container do not easily splash onto the dish, making it possible to wash the cooking container without staining the food or the dish on which the food is served.

In the automated cooking device in the aspect of the invention according to claim 2, in addition to the effect of the automated cooking device in the aspect of the invention according to claim 1, since the opening part of the cooking container is directed downward in the washing posture, the stain on the inner surface of the cooking container flows down together with the washing water when the inner surface of the cooking container is washed with the washing water, making it difficult for the washing water or stain to remain on the inner surface of the cooking container after the cooking container is washed in the washing posture.

In the automated cooking device in the aspect of the invention according to claim 3, in addition to the effect of the automated cooking device in the aspect of the invention according to claim 1 or 2, since the container holding unit includes the container heating part configured to heat the cooking container while facing, with a space, the outer bottom surface of the cooking container in the cooking posture, the container heating part of the container holding unit in the cooking posture heats the bottom part of the cooking container while securing the sufficient facing area from the outer bottom surface of the cooking container, making it possible to heat the cooking container without unevenness while smoothly rotating the cooking container in the cooking posture.

In the automated cooking device in the aspect of the invention according to claim 4, in addition to the effect of the automated cooking device in the aspect of the invention according to any one of claims 1 to 3, since the cooking container is detachably attached to the container holding unit, only the cooking container can be detached without disassembling the entire device, making it easy to maintain the cooking container.

In the automated cooking device in the aspect of the invention according to claim 5, in addition to the effect of the automated cooking device in the aspect of the invention according to any one of claims 1 to 4, since the cooking container includes the stirring member that is provided on the inner bottom surface or the inner side surface of the cooking container and protrudes toward the internal space of the cooking container, even if the ingredients are biased on the vertically lower side of the cooking container when the cooking container is rotated in the cooking posture, the ingredients can be stirred sufficiently, making it possible to stir the ingredients uniformly without unevenness.

BRIEF DESCRIPTION OF DRAWINGS

FIG. 6A is a right side view of the automated cooking device 100 illustrated in FIG. 1 in a cooking posture.

FIG. 7 is a left side view of the automated cooking device 100 illustrated in FIG. 1 in a serving posture.

FIG. 9A is a main part cross-sectional view in which a container fall prevention part 234e of an automated cooking device 200 according to a second example of the present invention is closed.

DESCRIPTION OF EMBODIMENTS

Figure 1:
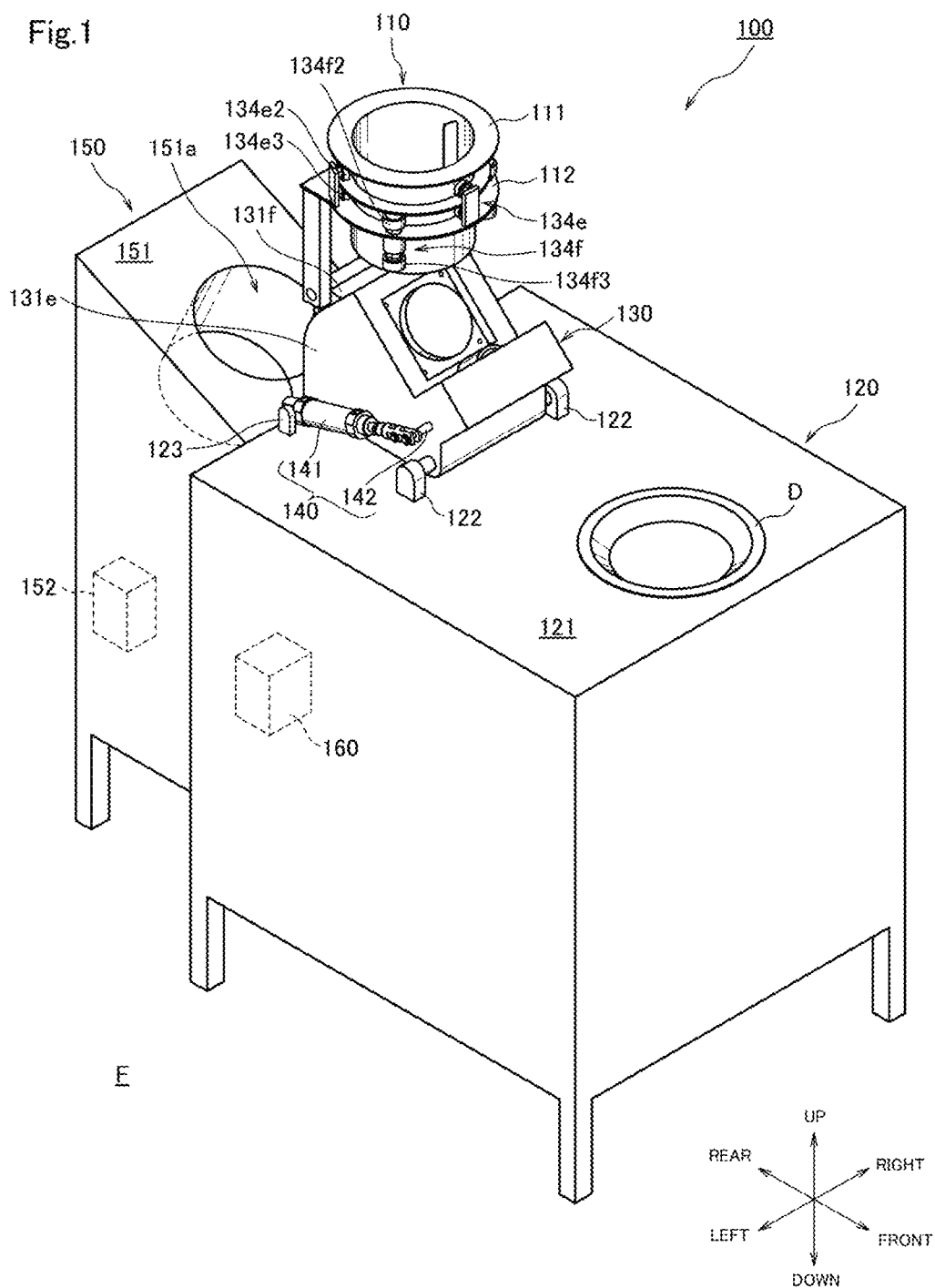
FIG. 1 is a left perspective view of an automated cooking device 100 according to a first example of the present invention.

A specific embodiment of the present invention may be any automated cooking device including a container holding unit pivotally provided in a manner of being able to go up and down in a front-rear direction of a cooking table and configured to hold a cooking container with a bottomed cylindrical shape, a rotation unit provided between the cooking table and the container holding unit and configured to make the container holding unit go up and down with respect to the cooking table, and a control unit configured to control driving of the container holding unit and the rotation unit, the automated cooking device being configured to at least stir and cook ingredients contained in the cooking container, in which the container holding unit includes a base frame coupled to the rotation unit, a container rotation mechanism provided in the base frame and configured to rotate the cooking container using, as a center, a central axis extending in a depth direction of the cooking container, a rotation support mechanism pivotally provided on the base frame and supporting rotation of the cooking container, and a rotation driving mechanism configured to rotate the rotation support mechanism in a manner of being able to make the rotation support mechanism go up and down in the front-rear direction of the cooking table with respect to the base frame, a pivot axis of the container holding unit with respect to the cooking table is disposed apart to a front side from a rotation axis of the rotation support mechanism of the container holding unit with respect to the base frame, and the control unit controls the driving of the rotation driving mechanism of the container holding unit and the rotation unit so as to change the container holding unit to any of an ingredient receiving posture in which the cooking container receives the ingredients from an ingredient supply device that supplies the ingredients to the cooking container, a cooking posture in which the container rotation mechanism rotates the cooking container in a state in which the cooking container is inclined forward with respect to the cooking table so as to stir the ingredients, a serving posture in which the container holding unit is inclined forward more than in the cooking posture with respect to the cooking table so as to make the cooking container face downward to a dish placed on the front side of the container holding unit, and a washing posture in which the rotation support mechanism of the container holding unit is inclined backward with respect to the base frame and the cooking container is washed on a rear side of the container holding unit, so that the cooking container is washed without staining the food or the dish on which the food is distributed.

For example, the automated cooking device according to the present invention is mainly installed in restaurants; however, the location of the automated cooking device according to the present invention is not limited to this and the automated cooking device may be installed in food courts, business offices, homes, etc.

For example, the ingredients to be cooked by the automated cooking device according to the present invention may be any food ingredient such as rice, noodles, vegetables, fish, grains, and various seasonings.

First Example

An automated cooking device 100 according to a first example of the present invention is described below with reference to FIG. 1 to FIG. 8.
<1. Outline of Automated Cooking Device>
First, an outline of the automated cooking device 100 is described with reference to FIG. 1 to FIG. 4.

Figure 2:
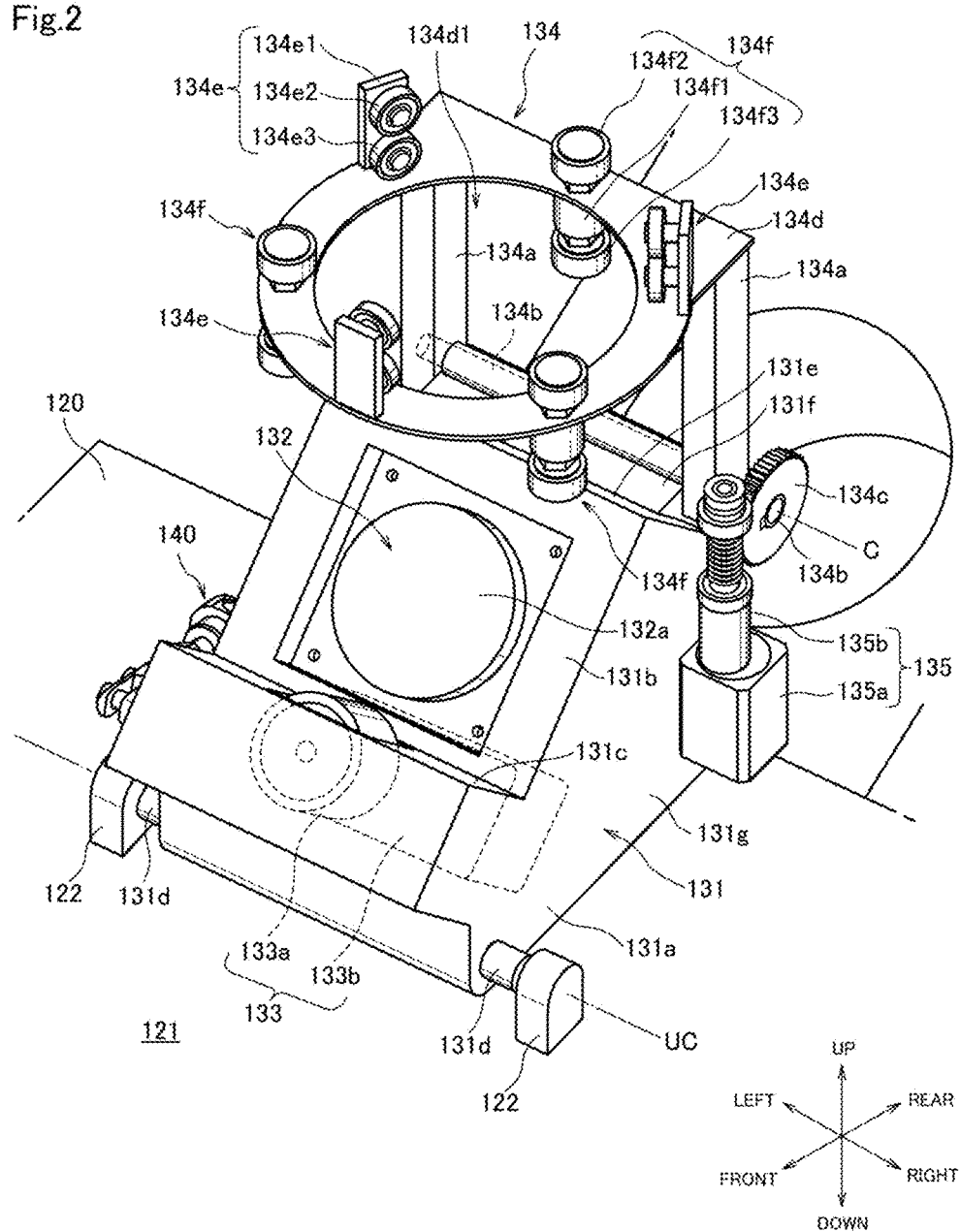
FIG. 2 is a main part enlarged right perspective view of the automated cooking device 100 illustrated in FIG. 1 from which a cooking container 110 is detached.
Figure 3A:
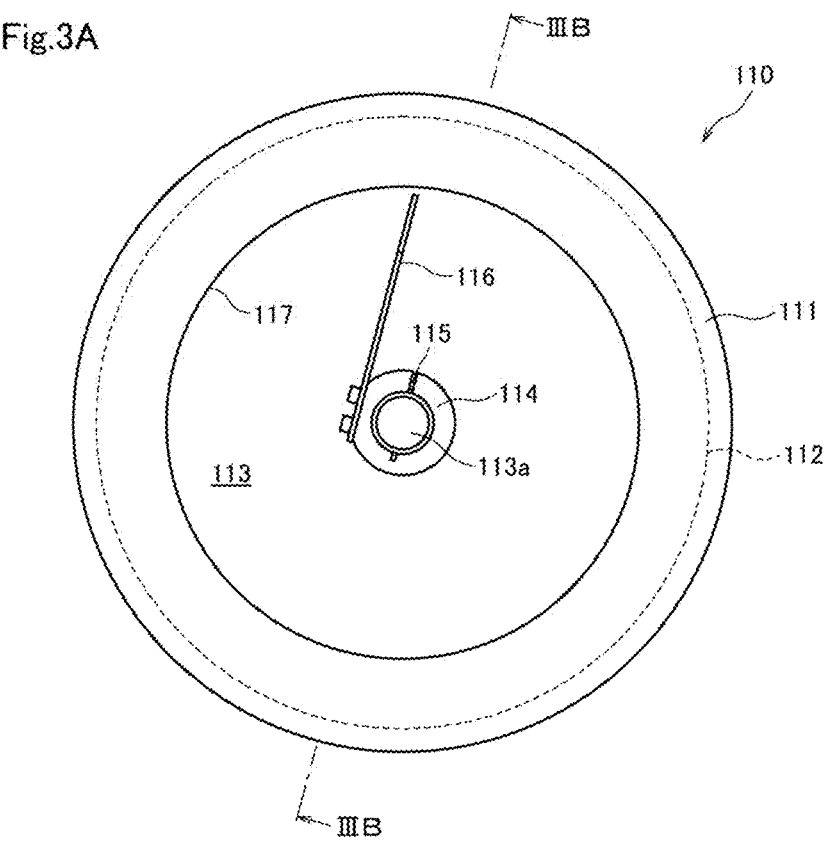
FIG. 3A is a plan view of the cooking container illustrated in FIG. 1.
Figure 3B:
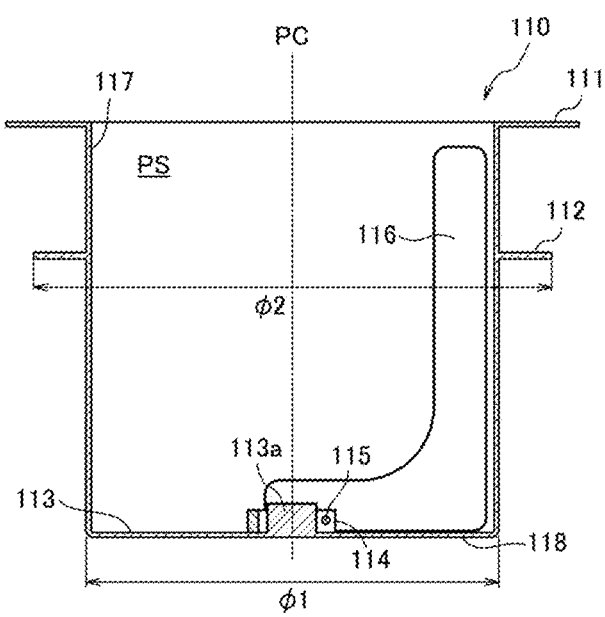
FIG. 3B is a cross-sectional view taken along IIIB-IIIB in FIG. 3A.
Figure 4:
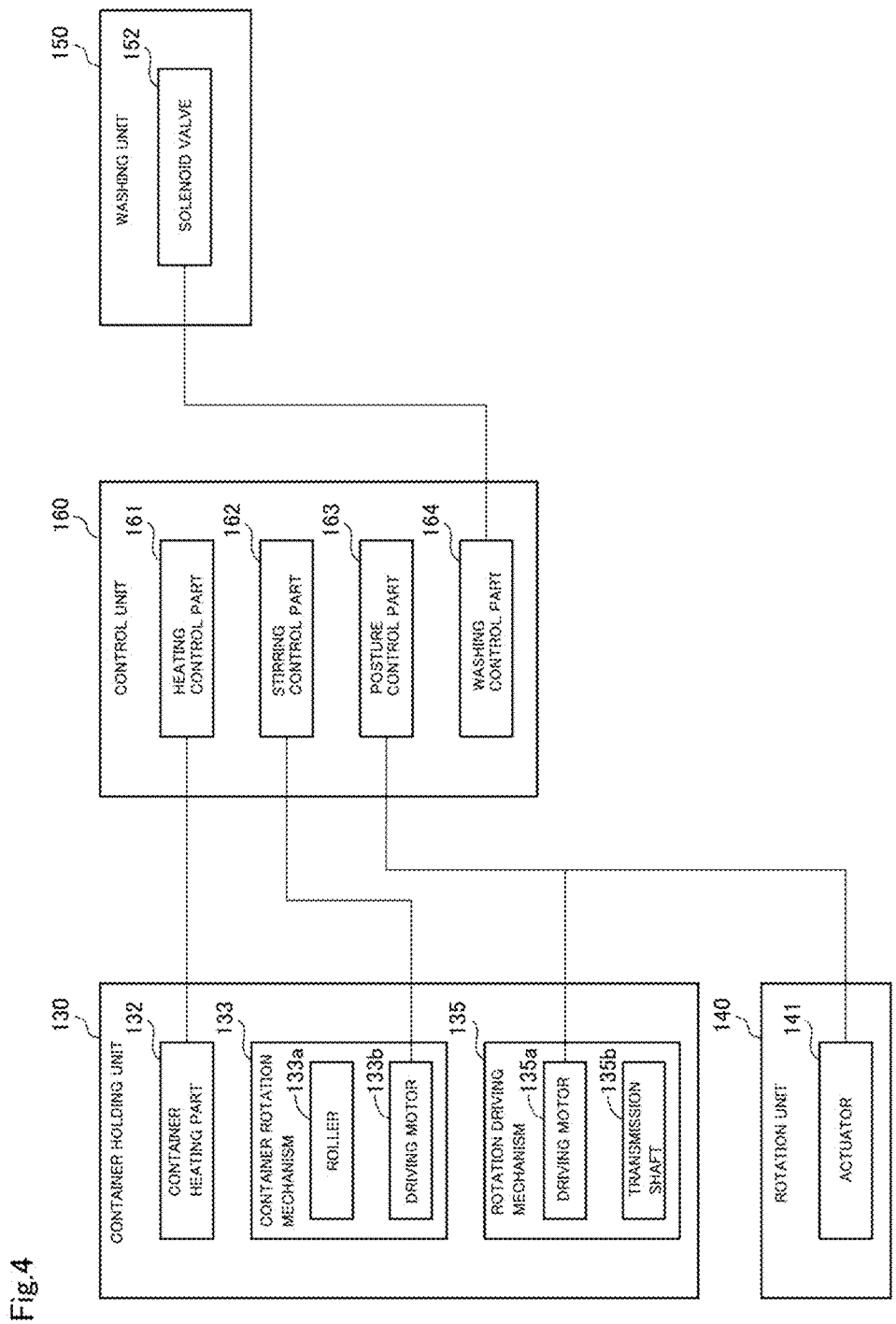
FIG. 4 is a system configuration diagram of the automated cooking device 100 illustrated in FIG. 1.

FIG. 1 is a left perspective view of the automated cooking device 100 according to the first example of the present invention. FIG. 2 is a main part enlarged right perspective view of the automated cooking device 100 illustrated in FIG. 1 from which a cooking container 110 is detached. FIG. 3A is a plan view of the cooking container illustrated in FIG. 1. FIG. 3B is a cross-sectional view taken along IIIB-IIIB in FIG. 3A. FIG. 4 is a system configuration diagram of the automated cooking device 100 illustrated in FIG. 1.

The automated cooking device 100 is a device that automatically cooks a food by stirring and cooking ingredients, and includes, as illustrated in FIG. 1, the cooking container 110 with a bottomed cylindrical shape that contains ingredients, a cooking table 120 placed on a floor surface F, a container holding unit 130 pivotally provided in a manner of being able to go up and down in a front-rear direction of the cooking table 120 and configured to hold the cooking container 110, a rotation unit 140 provided between the cooking table 120 and the container holding unit 130 and configured to make the container holding unit 130 go up and down with respect to the cooking table 120, a washing unit 150 configured to wash the cooking container 110, and a control unit 160 configured to control at least the container holding unit 130, the rotation unit 140, and the washing unit 150.
<1.1. Cooking Container>
As illustrated in FIG. 1, the cooking container 110 is a metal container with a bottomed cylindrical shape and includes an upper brim part 111 formed at an upper end and a lower brim part 112 formed below the upper brim part 111. As illustrated in FIG. 3A, the upper brim part 111 and the lower brim part 112 are circular in plan view, with the upper brim part 111 having larger diameter than the lower brim part 112.

Furthermore, an inner bottom surface 113 of the cooking container 110 is flat as illustrated in FIG. 3.

As illustrated in FIG. 3A and FIG. 3B, a bottom surface protrusion part 113a with a cylindrical shape protrudes from the inner bottom surface 113 toward the upper end.

To this bottom surface protrusion part 113a, a C-shaped coupling member 114 is attached by being fastened with a fastening member 115 illustrated in FIG. 3B.

To the coupling member 114, a stirring member 116 that protrudes toward an internal space PS of the cooking container 110 is attached, as illustrated in FIG. 3A.

The stirring member 116, which is provided via the coupling member 114 on the inner bottom surface 113 of the cooking container 110, is an L-shaped member and is separated from an inner side surface 117 of the cooking container as illustrated in FIG. 3B.
<1.2. Cooking Table>
The cooking table 120 is a cuboid table having four legs and a flat horizontal top surface 121 as illustrated in FIG. 1.

On a front side of the top surface 121 of the cooking table 120, as illustrated in FIG. 1, a dish D is placed, and on a rear side of the top surface 121 of the cooking table 120, as illustrated in FIG. 2, a pair of container holding unit support parts 122 that support the container holding unit 130 in a manner of being able to make the container holding unit 130 go up and down and a rotation unit support part 123 to which one end of the rotation unit 140 is attached are formed.

Here, the container holding unit support parts 122 described above are formed on both side surfaces on the front side of the container holding unit 130 and protrude vertically upward from the top surface 121, as illustrated in FIG. 1 and FIG. 2.

The rotation unit support part 123 is formed on a rear left side surface of the container holding unit 130 and protrudes vertically upward from the top surface 121, as illustrated in FIG. 1.
<1.3. Container Holding Unit>
The container holding unit 130 includes a base frame 131 coupled to the rotation unit 140, a container heating part 132 configured to heat the cooking container 110, a container rotation mechanism 133 provided in the base frame 131 and configured to rotate the cooking container 110 using a central axis PC, which extends in a depth direction of the cooking container 110, as a center, a rotation support mechanism 134 pivotally provided on the base frame 131 and supporting the rotation of the cooking container 110, and a rotation driving mechanism 135 configured to rotate the rotation support mechanism 134 in a manner of being able to make the rotation support mechanism 134 go up and down in the front-rear direction of the cooking table 120 with respect to the base frame 131.

<1.3.1. Base Frame>

The base frame 131 has a fan-like shape in side view, and in FIG. 2, a bottom surface 131a is apart from the top surface 121 of the cooking table 120 while remaining approximately parallel to the top surface 121.

That is, the base frame 131 has an inclined surface 131b that is inclined forward as illustrated in FIG. 2. A vertical surface 131c is formed that rises from a front end of this inclined surface 131b in a manner of being substantially perpendicular to the inclined surface 131b.

From both side surfaces of a lower front end side of the base frame 131, rotation shafts 131d with the same diameter extending coaxially protrude.

The rotation shafts 131d are supported pivotally by the container holding unit support parts 122 of the cooking table 120.

Thus, the container holding unit 130 is pivotably provided in a manner of being able to go up and down in the front-rear direction of the cooking table 120.

In addition, a coupling base part 131f, which is coupled to the rotation support mechanism 134, protrudes backward on a rear surface 131e of the base frame 131.

<1.3.2. Container Heating Part>

The container heating part 132 is fitted into the inclined surface 131b of the base frame 131, as illustrated in FIG. 2.

Here, the container heating part 132 has a flat surface 132a, which is substantially flush with the inclined surface 131b of the base frame 131.

The surface 132a of the container heating part 132 faces an outer bottom surface 118 of the cooking container 110 with a space therebetween.

A coil is installed inside the container heating part 132, and the container heating part 132 heats the cooking container by induction heating.

<1.3.3. Container Rotation Mechanism>

The container rotation mechanism 133 is embedded in the base frame 131 and, as illustrated in FIG. 2, includes a cylindrical roller 133a that is partially exposed from the vertical surface 131c of the base frame 131 and a driving motor 133b that rotates this roller 133a.

<1.3.4. Rotation Support Mechanism>

As illustrated in FIG. 2, the rotation support mechanism 134 includes a pair of support columns 134a, a coupling shaft 134b that couples the pair of support columns 134a, a worm gear 134c, an annular member 134d, container fall prevention parts 134e that prevent fall of the cooking container 110 from the annular member 134d, and container bias suppression parts 134f that suppress the bias when the cooking container 110 rotates.

Here, the support columns 134a have a rectangular columnar shape, and are disposed on the left and right of the coupling base part 131f of the base frame 131.

The coupling shaft 134b is a cylindrical member extending in a left-right direction, and is rotatably inserted into the coupling base part 131f of the base frame 131.

A rotation axis C of this coupling shaft 134b coincides with a longitudinal central axis of the coupling shaft 134b.

A left end of the coupling shaft 134b is coupled and fixed to the support column 134a, and a right end of the coupling shaft 134b is coupled to the worm gear 134c through the support column 134a.

Therefore, a pivot axis UC of the container holding unit 130 with respect to the cooking table 120 is disposed apart to the front side from the rotation axis C of the rotation support mechanism 134 of the container holding unit 130 with respect to the base frame 131 in side view.

Furthermore, the aforementioned annular member 134d has a thin plate shape and is connected to the support columns 134a on the rear side as illustrated in FIG. 2. The annular member 134d is substantially parallel to the top surface 121 of the cooking table 120 in FIG. 2. The annular member 134d includes a circular opening part 134d1.

The inner diameter of this opening part 134d1 is larger than an outer diameter φ1 of the main body of the cooking container 110 illustrated in FIG. 3 and smaller than an outer diameter φ2 of the lower brim part 112 of the cooking container 110.

The container fall prevention part 134e includes a base plate 134e1, an upper pressing roller 134e2, and a lower pressing roller 134e3 as illustrated in FIG. 2. The base plate 134e1 is a plate material that rises vertically from the annular member 134d, and in this example, three base plates 134e1 are disposed at equal intervals in plan view.

The upper pressing roller 134e2 is rotatably attached to a rotation shaft protruding from the base plate 134e1 toward the opening part 134d1 of the annular member 134d, and rotates in a tangential direction of the opening part 134d1.

The lower pressing roller 134e3 is closer to the annular member 134d than the upper pressing roller 134e2, and is rotatably attached to a rotation shaft protruding from the base plate 134e1 toward the opening part 134d1 of the annular member 134d, and rotates in the tangential direction of the opening part 134d1.

As illustrated in FIG. 1, the container fall prevention parts 134e with such a structure hold the lower brim part 112 of the cooking container 110 from an up-down direction while allowing the cooking container 110 to rotate freely about the central axis PC of the cooking container 110 with the upper pressing rollers 134e2 and lower pressing rollers 134e3.

Therefore, when the cooking container 110 rotates about the central axis PC, the upper pressing roller 134e2 and the lower pressing roller 134e3 also rotate.

Furthermore, the aforementioned container bias suppression part 134f includes a spacer 134f1 attached to a lower surface of the annular member 134d, an upper roller 134f2, and a lower roller 134f3.

The upper roller 134f2 is rotatably attached to a rotation shaft extending vertically upward from the spacer 134f1 to the annular member 134d and rotates in the tangential direction of the opening part 134d1 as illustrated in FIG. 2.

The lower roller 134f3, which has the same outer diameter as the upper roller 134f2, is rotatably attached to a rotation shaft extending vertically downward from the spacer 134f1 and rotates in the tangential direction of the opening part 134d1 as illustrated in FIG. 2.

Thus, the container bias suppression part 134f is in contact with the side surface of the cooking container 110 with the upper roller 134f2 and the lower roller 134f3 as illustrated in FIG. 1.

When the cooking container 110 rotates about the central axis PC, the upper rollers 134f2 and the lower rollers 134f3 also rotate.

<1.3.5. Rotation Driving Mechanism>

As illustrated in FIG. 2 and FIG. 4, the rotation driving mechanism 135 includes a driving motor 135a that is attached to a right side surface 131g of the base frame 131 and a transmission shaft 135b that is attached to a tip of this driving motor 135a and rotates together with the driving motor 135a.

This transmission shaft 135b is a cylindrical worm whose outer periphery includes spiral teeth that engage with the worm gear 134c of the rotation support mechanism 134 as illustrated in FIG. 2.

In FIG. 2 in which the bottom surface 131a of the base frame 131 is separated from the top surface 121 of the cooking table 120 while remaining substantially parallel to the top surface 121, the transmission shaft 135b extends in the up-down direction.

Therefore, when the driving motor 135a is driven, the transmission shaft 135b rotates, and the power of the driving motor 135a is transmitted to the coupling shaft 134b of the rotation support mechanism 134 through the worm gear 134c that is engaged with the transmission shaft 135b.

This makes the rotation support mechanism 134 go up and down with respect to the base frame 131.

<1.4. Rotation Unit>

As illustrated in FIG. 1, the rotation unit 140 includes an actuator 141, one end side of which is coupled to the rotation unit support part 123 of the cooking table 120, and a coupling shaft 142, which is coupled to the other end side of the actuator 141 and extends in a direction (left-right direction) orthogonal to the longitudinal direction (front-rear direction) of the actuator 141.

The actuator 141 is capable of extension and contraction in the longitudinal direction.

The coupling shaft 142 is coupled to the left side surface of the base frame 131 of the container holding unit 130 as illustrated in FIG. 1.

The coupling position between the left side surface of the base frame 131 of the container holding unit 130 and the coupling shaft 142 of the rotation unit 140 is above the rotation shaft 131d of the container holding unit 130 as illustrated in FIG. 1.

<1.5. Washing Unit>

The washing unit 150 is disposed behind the cooking table 120 and has a top surface 151 thereof inclined forward as illustrated in FIG. 1.

A cylindrical opening part 151a is formed on the top surface 151, and a washing nozzle (not illustrated) that sprays washing water is installed inside this opening part 151a.

As illustrated in FIG. 1 and FIG. 4, the washing unit 150 includes a solenoid valve 152 that is disposed in a flow channel connecting between a water supply source (not illustrated) and the washing nozzle to open and close the flow channel.

<1.6. Control Unit>

The control unit 160 is provided inside the cooking table 120 as illustrated in FIG. 1.

As illustrated in FIG. 4, the control unit 160 includes at least a heating control part 161 that controls the container heating part 132 of the container holding unit 130, a stirring control part 162 that controls the driving of the driving motor 133b of the container rotation mechanism 133 of the container holding unit 130, a posture control part 163 that controls the driving of the driving motor 135a of the rotation driving mechanism 135 of the container holding unit 130 and the actuator 141 of the rotation unit 140, and a washing control part 164 that controls the solenoid valve 152b of the washing unit 150.

<2. Operation of Automated Cooking Device (Various Postures)>

Next, an operation of the automated cooking device 100 is described with reference to FIG. 5 to FIG. 8.

Figure 5:
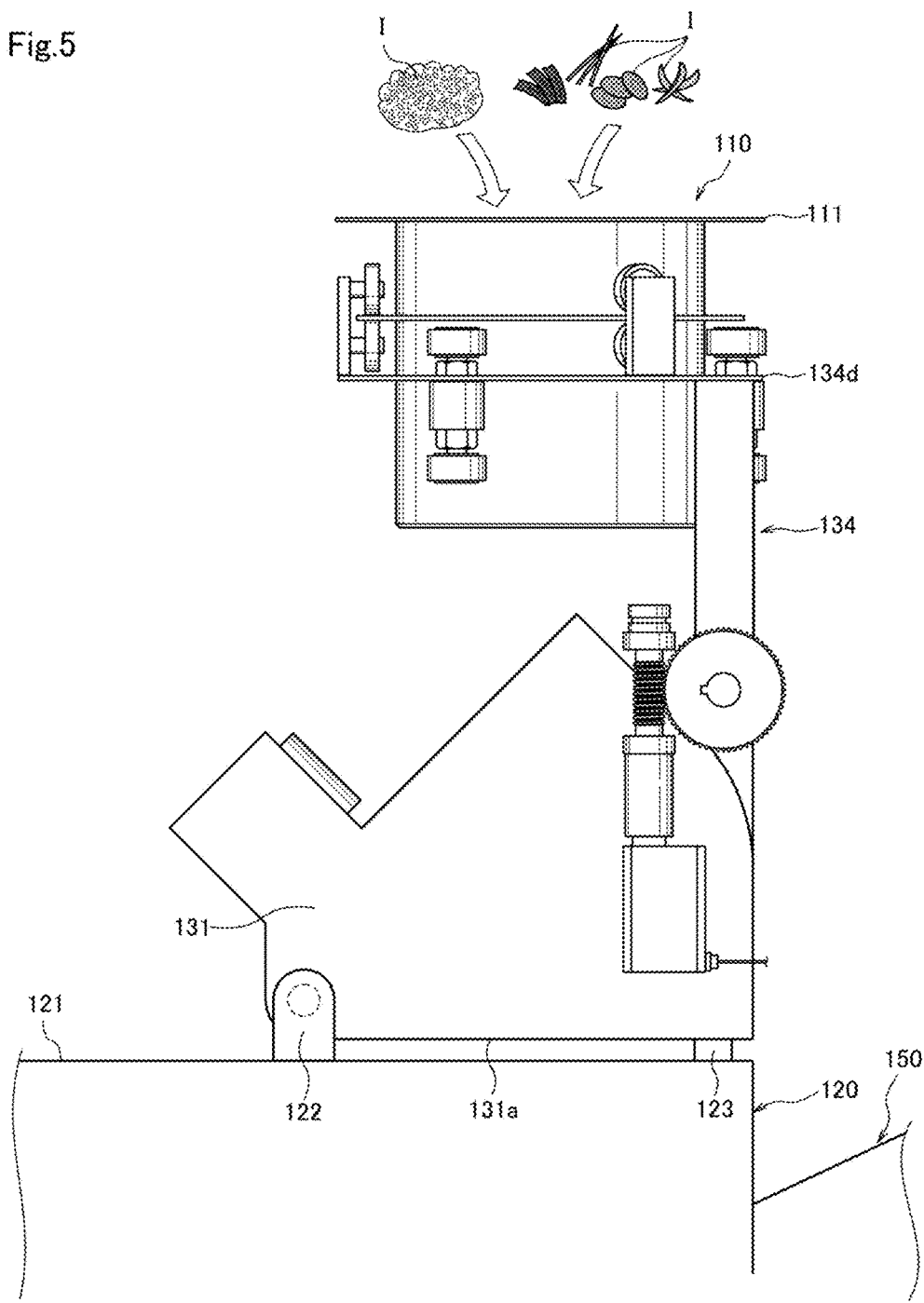
FIG. 5 is a right side view of the automated cooking device 100 illustrated in FIG. 1 in an ingredient receiving posture.
Figure 6B:
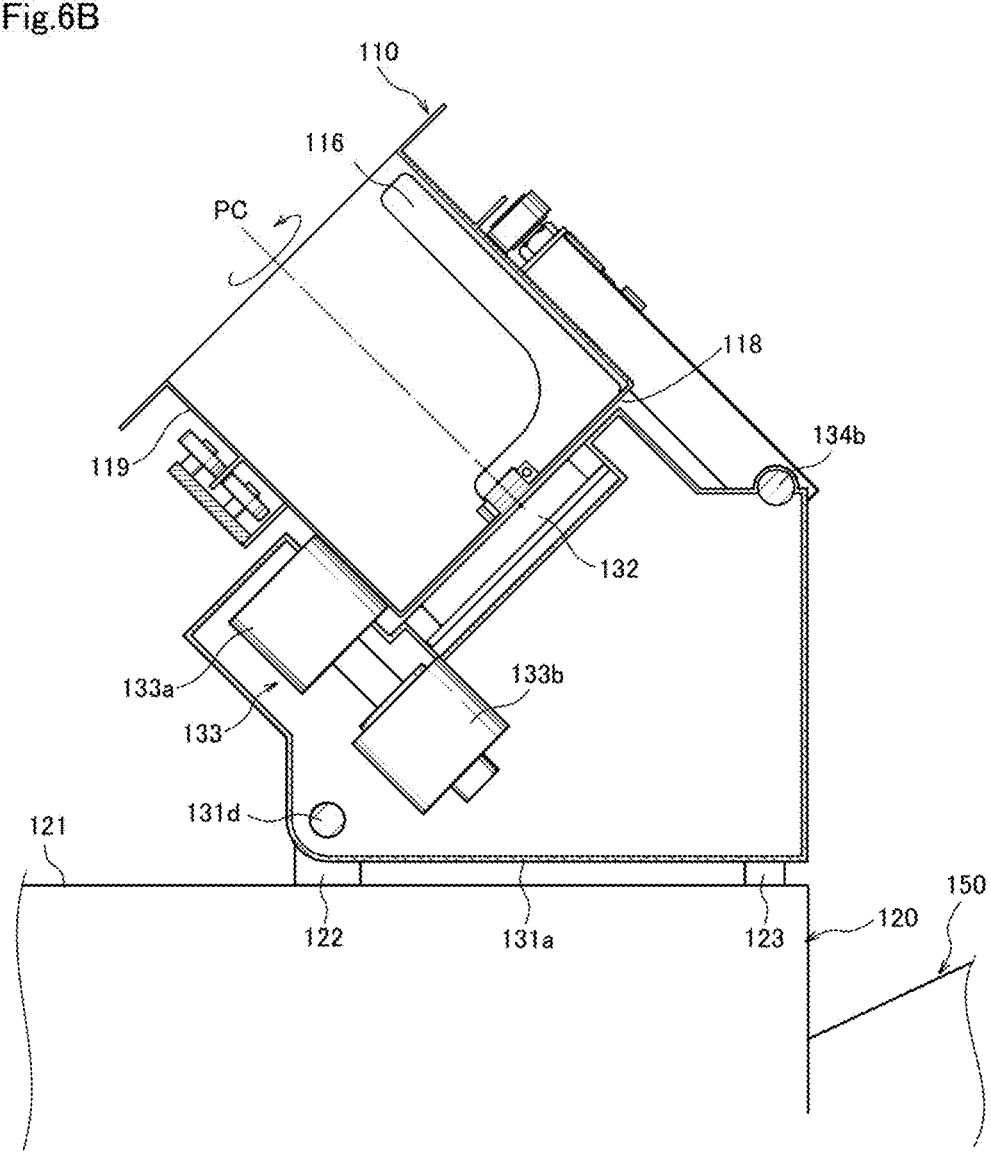
FIG. 6B is a main part cross-sectional view of the automated cooking device 100 illustrated in FIG. 1 in the cooking posture.
Figure 8:
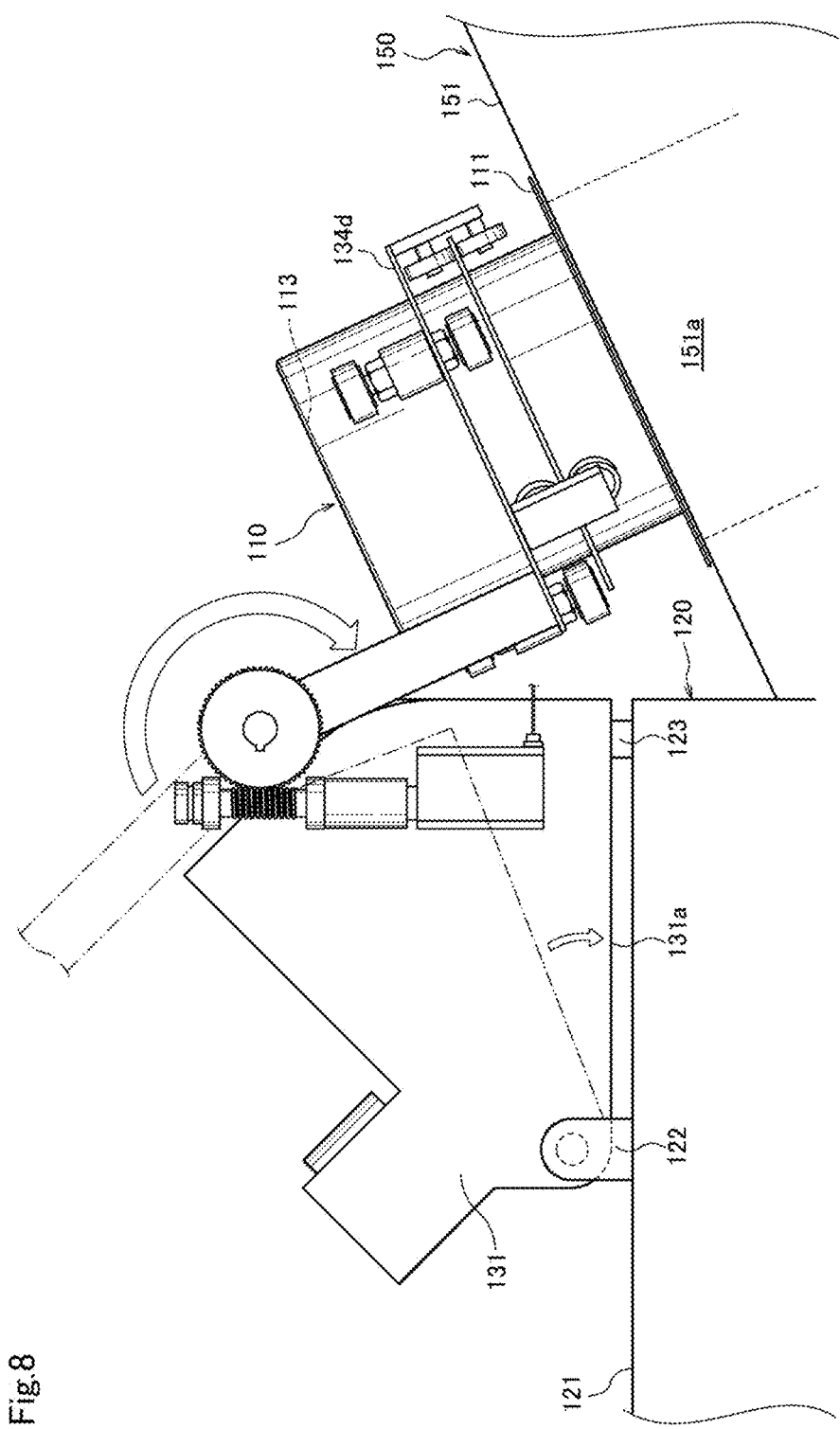
FIG. 8 is a left side view of the automated cooking device 100 illustrated in FIG. 1 in a washing posture.

FIG. 5 is a right side view of the automated cooking device 100 illustrated in FIG. 1 in the ingredient receiving posture. FIG. 6A is a right side view of the automated cooking device 100 illustrated in FIG. 1 in the cooking posture. FIG. 6B is a main part cross-sectional view of the automated cooking device 100 illustrated in FIG. 1 in the cooking posture. FIG. 7 is a left side view of the automated cooking device 100 illustrated in FIG. 1 in the serving posture. FIG. 8 is a left side view of the automated cooking device 100 illustrated in FIG. 1 in the washing posture.

The automated cooking device 100 having received a cooking instruction based on a user's operation causes the control unit 160 to control the driving of the rotation driving mechanism 135 of the container holding unit 130 and the rotation unit 140, so that the container holding unit 130 changes to the ingredient receiving posture, the cooking posture, the serving posture, or the washing posture, thereby automatically cooking the food.

<2.1. Ingredient Receiving Posture>

First, the ingredient receiving posture is described based on FIG. 5.

The ingredient receiving posture is the posture in which the cooking container 110 receives ingredients I (for example, food ingredients, liquid seasoning, or the like) from an ingredient supply device (not illustrated) that supplies the ingredients I to the cooking container 110.

Specifically, as illustrated in FIG. 5, in the ingredient receiving posture, the bottom surface 131a of the base frame 131 is separated from the top surface 121 of the cooking table 120 while remaining substantially parallel to the top surface 121, and moreover, the annular member 134d of the rotation support mechanism 134 remains substantially parallel to the top surface 121 of the cooking table 120.

Thus, in the ingredient receiving posture, the upper brim part 111 of the cooking container 110 is substantially parallel to the top surface 121 of the cooking table 120.

<2.2. Cooking Posture>

Next, the cooking posture is described based on FIG. 6A and FIG. 6B.

The cooking posture is the posture in which the container rotation mechanism 133 rotates the cooking container 110 with the cooking container 110 inclined forward with respect to the cooking table 120 (that is, to the horizontal plane), thereby stirring the ingredients in the cooking container 110.

Specifically, as illustrated in FIG. 6A, in the cooking posture, the bottom surface 131a of the base frame 131 is separated from the top surface 121 of the cooking table 120 while remaining substantially parallel to the top surface 121, and moreover, the annular member 134d of the rotation support mechanism 134 remains substantially parallel to the inclined surface 131b of the base frame 131.

Thus, as illustrated in FIG. 6B, in the cooking posture, the outer bottom surface 118 of the cooking container 110 faces the container heating part 132 with a space therebetween while remaining substantially parallel to the container heating part 132, and an outer side surface 119 of the cooking container 110 is in contact with the roller 133a of the container rotation mechanism 133.

In this state, by supplying current to the container heating part 132 and applying an alternating current, a magnetic flux alternating at the same frequency as that alternating current is generated in the container heating part 132, causing an induction current in the cooking container 110. Thus, heat is generated in the cooking container 110.

By rotating the driving motor 133b of the container rotation mechanism 133, the cooking container 110 rotates about the central axis PC via the roller 133a.

This rotation of the cooking container 110 causes the ingredients input into the cooking container 110 to be stirred by the stirring member 116 of the cooking container 110.

Thus, the container heating part 132 of the container holding unit 130 in the cooking posture heats the bottom part of the cooking container 110 while securing the sufficient facing area from the outer bottom surface 118 of the cooking container 110, making it possible to heat the cooking container 110 without unevenness while smoothly rotating the cooking container 110 in the cooking posture.

In addition, since the cooking container 110 includes the stirring member 116, even if the ingredients are biased on the vertically lower side of the cooking container 110 when the cooking container 110 is rotated in the cooking posture, the ingredients are stirred sufficiently, making it possible to stir the ingredients I uniformly without unevenness.

Heating the cooking container 110 by the container heating part 132 in the cooking posture does not have to be intermittent, and the heating may be performed as appropriate or stopped depending on the contents of the food.

<2.3. Serving Posture>

Next, the serving posture is described based on FIG. 7.

The serving posture is the posture in which the container holding unit 130 is inclined forward toward the cooking table 120 more than in the cooking posture, and the cooking container 110 is directed downward to the dish D placed on the front side of the container holding unit 130.

Specifically, as illustrated in FIG. 7, in the serving posture, the actuator 141 of the rotation unit 140 is extended to make the bottom surface 131a of the base frame 131 inclined with respect to the top surface 121 of the cooking table 120, while the annular member 134d of the rotation support mechanism 134 remains substantially parallel to the inclined surface 131b of the base frame 131.

Thus, in the serving posture, the cooking container 110 is inclined forward with respect to the dish D.

At this time, the cooking container 110 will not fall out of the container holding unit 130 because the lower brim part 112 of the cooking container 110 is held by the container fall prevention parts 134e of the container holding unit 130.

In the serving posture, the container heating part 132 may or may not heat the cooking container 110.

<2.4. Washing Posture>

Finally, the washing posture is described based on FIG. 8.

The washing posture is the posture in which the rotation support mechanism 134 of the container holding unit 130 is inclined backward with respect to the base frame 131 and the cooking container 110 is washed on the rear side of the container holding unit 130.

Specifically, as illustrated in FIG. 8, in the washing posture, the bottom surface 131a of the base frame 131 is separated from the top surface 121 of the cooking table 120 while remaining substantially parallel to the top surface 121, and the annular member 134d of the rotation support mechanism 134 remains substantially parallel to the top surface 151 of the washing unit 150.

Thus, in the washing posture, the upper brim part 111 of the cooking container 110 is substantially parallel to the top surface 151 of the washing unit 150 and the inner bottom surface 113 of the cooking container 110 faces the opening part 151a of the washing unit 150.

That is to say, the opening part of the cooking container 110 is directed downward.

Thus, when the inner surface (inner bottom surface 113 and inner side surface 117) of the cooking container 110 is washed with washing water, the stain on the inner surface of the cooking container 110 flows down together with the washing water, making it difficult for the washing water or stain to remain on the inner surface of the cooking container 110 after the cooking container 110 is washed in the washing posture.

In the washing posture, the cooking container 110 will not fall out of the container holding unit 130 because the lower brim part 112 of the cooking container 110 is held by the container fall prevention parts 134e of the container holding unit 130.

<3. Effects of Automated Cooking Device 100>

According to the automated cooking device 100 described above, the driving of the rotation driving mechanism 135 of the container holding unit 130 and the rotation unit 140 is controlled so as to change the container holding unit 130 to any of the ingredient receiving posture, the cooking posture, the serving posture, and the washing posture. Thus, by simply changing the container holding unit 130 in the order of the ingredient receiving posture, the cooking posture, and the serving posture, the ingredients I can be stirred and cooked, and served on the dish D. Accordingly, by repeatedly changing the container holding unit 130 in the order of the ingredient receiving posture, the cooking posture, the serving posture, and the washing posture, a large amount of foods can be cooked automatically.

Additionally, the pivot axis UC of the container holding unit 130 with respect to the cooking table 120 is disposed apart to the front side from the rotation axis C of the rotation support mechanism 134 of the container holding unit 130 with respect to the base frame 131, and the control unit 160 controls the driving of the rotation driving mechanism 135 of the container holding unit 130 and the rotation unit 140 so as to change the container holding unit 130 to at least the serving posture in which the container holding unit 130 is inclined forward more than in the cooking posture with respect to the cooking table 120 so as to make the cooking container 110 face downward to the dish D placed on the front side of the container holding unit 130, and the washing posture in which the rotation support mechanism 134 of the container holding unit 130 is inclined backward with respect to the base frame 131 and the cooking container 110 is washed on the rear side of the container holding unit 130. Thus, the position of the cooking container 110 in the front-rear direction in the serving posture and the position of the cooking container 110 in the front-rear direction in the washing posture get away from each other in the front-rear direction farther than in the case where the cooking container 110 is rotated in the front-rear direction of the cooking table 120 by one rotation shaft. Accordingly, when the cooking container 110 is washed in the washing posture, the washing water for washing the inner surface of the cooking container 110 and the stain adhering to the inner surface of the cooking container 110 do not easily splash onto the dish D, making it possible to wash the cooking container without staining the food or the dish D on which the food is served.

Second Example

An automated cooking device 200 according to a second example of the present invention will be described next based on FIG. 9A and FIG. 9B.

Figure 9B:
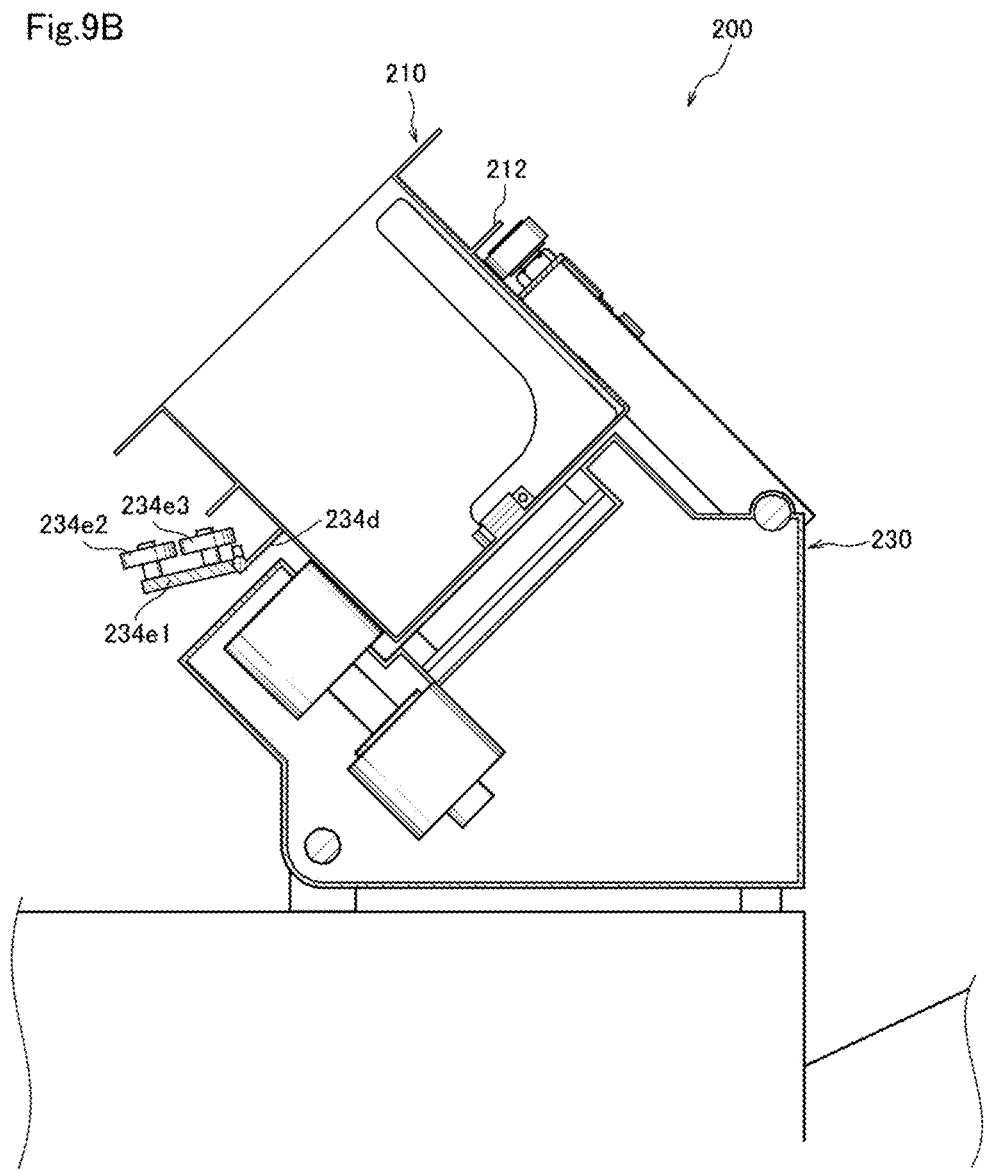
FIG. 9B is a main part cross-sectional view in which the container fall prevention part 234e of the automated cooking device 200 according to the second example of the present invention is open.

FIG. 9A is a main part cross-sectional view in which a container fall prevention part 234e of the automated cooking device 200 according to the second example of the present invention is closed. FIG. 9B is a main part cross-sectional view in which the container fall prevention part 234e of the automated cooking device 200 according to the second example of the present invention is open.

The automated cooking device 200 according to the second example is an automated cooking device in which the cooking container 110 of the automated cooking device 100 according to the first example is detachable from the rotation support mechanism 134 of the container holding unit 130.

Since many components of the automated cooking device 200 according to the second example are also common to those of the automated cooking device 100 according to the first example, the detailed description of the common items is omitted.

In a rotation support mechanism 234 of a container holding unit 230, an annular member 234d includes a base plate support part 234d2 protruding upward, as illustrated in FIG. 9A.

A base plate 234e1 of the container fall prevention part 234e is an L-shaped member in side view, including a rising part, a horizontal part, and a bending part.

This base plate 234e1 is rotatably engaged with the base plate support part 234d2 of the annular member 234d. Therefore, the base plate 234e1 is rotatable with respect to the annular member 234d, and when the horizontal part of the base plate 234e1 is in contact with the annular member 234d, the rising part of the base plate 234e1 rises perpendicular to the horizontal part.

In the automated cooking device 200 according to the second example, a cooking container 210 can be held by closing the container fall prevention part 234e as illustrated in FIG. 9A, or the cooking container 210 can be detached by opening the container fall prevention part 234e as illustrated in FIG. 9B.

That is to say, by closing the container fall prevention part 234e as illustrated in FIG. 9A, an upper pressing roller 234e2 and a lower pressing roller 234e3 hold a lower brim part 212 of the cooking container 210 and by opening the container fall prevention part 234e as illustrated in FIG. 9B (collapsing the base plate 234e1 in a direction away from the cooking container 210), the upper pressing roller 234e2 and the lower pressing roller 234e3 are separated from the lower brim part 212 of the cooking container 210 and the holding of the lower brim part 212 of the cooking container 210 by the upper pressing roller 234e2 and the lower pressing roller 234e3 is released.

Thus, in the automated cooking device 200 according to the second example, the cooking container 210 is detachably attached to the container holding unit 230, which allows only the cooking container 210 to be detached without disassembling the entire device, making it easy to maintain the cooking container 210.

<Modification>

Although the automated cooking devices according to an example of the present invention have been described above, the automated cooking device of the present invention is not limited to the automated cooking devices in the above examples.

For example, the stirring member of the cooking container is provided on the inner bottom surface through the coupling member in the above example; however, the stirring member may be provided on the inner side surface.

For example, the rotation unit is provided on the left side of the base frame and has the actuator and the coupling shaft in the above example; however, the configuration and arrangement of the rotation unit are not limited to these as long as the container holding unit can go up and down with respect to the cooking table.

For example, the washing unit washes the cooking container with the washing water in the above example; however, the method of washing the inner surface of the cooking container is not limited to the washing with water.

In the above example, the automated cooking device is equipped with the washing unit; however, the washing unit may be separated from the automated cooking device.

When the washing unit is separated from the automated cooking device, the automated cooking device and the washing unit are controlled by control devices that control the behavior of the automated cooking unit and the behavior of the washing unit.

For example, the container heating part of the container holding unit heats the cooking container by induction current in the above example; however, the mode of the container heating part is not limited to this and can be any type that can heat the cooking container. For example, a radiant heater or a sheath heater that heats the cooking container by heating with a heating wire may be used.

For example, the automated cooking device in the above example automatically cooks by automatically changing the posture of the container holding unit to the ingredient receiving posture, the cooking posture, the serving posture, and the washing posture according to cooking instructions based on the user's operations; however, a series of posture changes does not need to be performed automatically.

In other words, the automated cooking device may only change the posture of the container holding unit to any of the ingredient receiving posture, the cooking posture, the serving posture, and the washing posture according to cooking instructions based on the user's operations.

REFERENCE SIGNS LIST 100, 200 Automated cooking device
110, 210 Cooking container
111 Upper brim part
112, 212 Lower brim part
113 Inner bottom surface
113a Bottom surface protrusion part
114 Coupling member
115 Fastening member
116 Stirring member
117 Inner side surface
118 Outer bottom surface
119 Outer side surface
120 Cooking table
121 Top surface
122 Container holding unit support part
123 Rotation unit support part
130, 230 Container holding unit
131 Base frame
131a Bottom surface
131b Inclined surface
131c Vertical surface
131d Rotation shaft
131e Rear surface
131f Coupling base part
131g Right side surface
131h Left side surface
132 Container heating part 132a Surface
133 Container rotation mechanism
133a Roller
133b Driving motor
134, 234 Rotation support mechanism
134a Support column
134b Coupling shaft
134c Worm gear
134d, 234d Annular member
134d1 Opening part
234d2 Base plate support part
134e, 234e Container fall prevention part
134e1, 234e1 Base plate
134e2, 234e2 Upper pressing roller
134e3, 234e3 Lower pressing roller
234e4 Open/close shaft
134f Bias suppression part
134f1 Spacer
134f2 Upper roller
31
134f3 Lower roller
135 Rotation driving mechanism
135a Driving motor
135b Transmission shaft
140 Rotation unit
141 Actuator
142 Coupling shaft
150 Washing unit
151 Top surface
151a Opening part
152 Solenoid valve
160 Control unit
161 Heating control part
162 Stirring control part
163 Posture control part
164 Washing control part
F Floor surface
D Dish
I Ingredient
PS Internal space
PC Central axis
C Rotation axis
UC Pivot axis
φ1 Outer diameter of main body of cooking container
φ2 Outer diameter of lower brim part of cooking container

The invention claimed is:

1. An automated cooking device comprising:
a container holding unit pivotally provided in a manner of being able to move a cooking container up and down with respect to a cooking table;
a rotation unit provided between the cooking table and the container holding unit and configured to make the container holding unit go up and down with respect to the cooking table; and
a control unit configured to control driving of the container holding unit and the rotation unit,
the automated cooking device being configured to at least stir and cook ingredients contained in the cooking container, wherein
the container holding unit includes a base frame coupled to the rotation unit, a container rotation mechanism provided in the base frame and configured to rotate the cooking container using, as a center, a control axis extending in a depth direction of the cooking container, a rotation support mechanism pivotally provided on the base frame and supporting rotation of the cooking container, and a rotation driving mechanism configured to rotate the rotation support mechanism in a manner of being able to make the rotation support mechanism go up and down in a front-rear direction of the cooking table with respect to the base frame, and
the control unit controls the driving of the rotation driving mechanism of the container holding unit and the rotation unit so as to change the container holding unit to any of an ingredient receiving posture in which the cooking container receives the ingredients, a cooking posture in which the container rotation mechanism rotates the cooking container in a state in which the cooking container is inclined with respect to the cooking table so as to stir the ingredients, a serving posture in which the container holding unit is inclined more than in the cooking posture with respect to the cooking table, and a washing posture in which the rotation support mechanism of the container holding unit is made go up and down and the cooking container is washed.

2. The automated cooking device according to claim 1, wherein an opening part of the cooking container is directed downward in the washing posture.

3. The automated cooking device according to claim 1, wherein the container holding unit includes a container heating part configured to heat the cooking container while facing, with a space, an outer bottom surface of the cooking container in the cooking posture.

4. The automated cooking device according to claim 1, wherein the cooking container is detachably attached to the container holding unit.

5. The automated cooking device according to claim 1, wherein the cooking container includes a stirring member provided on an inner bottom surface or an inner side surface of the cooking container and protruding toward an internal space of the cooking container.

6. The automated cooking device according to claim 1, a pivot axis of the container holding unit with respect to the cooking table and a rotation axis of the rotation support mechanism of the container holding unit with respect to the base frame are disposed apart each other in the horizontal direction of the cooking table.

* * * * *